(12) United States Patent
Farmanbar et al.

(10) Patent No.: US 9,980,178 B2
(45) Date of Patent: *May 22, 2018

(54) FRAMEWORK FOR TRAFFIC ENGINEERING IN SOFTWARE DEFINED NETWORKING

(71) Applicant: Huawei Technologies Co., Ltd., Shenzhen (CN)

(72) Inventors: Hamidreza Farmanbar, Ottawa (CA); Xu Li, Nepean (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

This patent is subject to a terminal disclaimer.

(21) Appl. No.: 14/980,492

(22) Filed: Dec. 28, 2015

(65) Prior Publication Data
US 2016/0112326 A1    Apr. 21, 2016

Related U.S. Application Data

(63) Continuation-in-part of application No. 14/097,930, filed on Dec. 5, 2013, now Pat. No. 9,225,652.

(51) Int. Cl.
*H04W 28/12* (2009.01)
*H04L 12/801* (2013.01)

(52) U.S. Cl.
CPC .............. *H04W 28/12* (2013.01); *H04L 47/18* (2013.01)

(58) Field of Classification Search
CPC ............................... H04W 28/12; H04L 47/18
See application file for complete search history.

(56) References Cited

U.S. PATENT DOCUMENTS 6,748,233 B1    6/2004    Arnold et al.
7,912,458 B2    3/2011    Ramer et al.
(Continued)

FOREIGN PATENT DOCUMENTS

JP    2015050774 A    3/2015
WO    2005119978 A1    12/2005
(Continued)

OTHER PUBLICATIONS

International Search Report and Written Opinion of the International Searching Authority received in Patent Cooperation Treaty Application No. PCT/US2015/010340 dated May 1, 2015, 9 pages.
(Continued)

*Primary Examiner* — Albert T Chou
(74) *Attorney, Agent, or Firm* — Slater Matsil, LLP

(57) ABSTRACT

System and method embodiments are provided for traffic engineering (TE) in software defined networking (SDN). The embodiments enable a complete end-to-end TE solution between a user equipment (UE) and a source/destination across a radio access network (RAN). In an embodiment, a method in a network component for TE in a SDN includes receiving TE information from a first core network component in a core network, a RAN component, wherein the RAN is communicably coupled to the core network, wherein the TE information includes a TE objective; and determining a TE decision between at least one UE and a second core network component in the core network according to the TE information and the TE objective, wherein the TE decision comprises information for at least one end-to-end path solution between the at least one UE and the second core network wherein the path traverses the core network and the RAN.

27 Claims, 5 Drawing Sheets

(56) References Cited

U.S. PATENT DOCUMENTS

| | | | |
|---|---|---|---|
| 7,983,662 B1 | 7/2011 | Ramer et al. | |
| 8,000,888 B2 | 8/2011 | Kim et al. | |
| 8,060,274 B2 | 11/2011 | Boss et al. | |
| 8,385,921 B1 | 2/2013 | Shousterman et al. | |
| 8,706,131 B2 | 4/2014 | Winters | |
| 8,842,578 B1 | 9/2014 | Zisapel et al. | |
| 8,949,420 B2 | 2/2015 | Banavar et al. | |
| 9,060,292 B2 | 6/2015 | Callard et al. | |
| 9,197,563 B2* | 11/2015 | Chrysos | H04L 47/115 |
| 9,225,652 B2* | 12/2015 | Li | H04L 47/18 |
| 9,450,864 B2* | 9/2016 | Zhao | |
| 2004/0017796 A1 | 1/2004 | Lemieux et al. | |
| 2005/0169266 A1 | 8/2005 | Aggarwal et al. | |
| 2006/0010250 A1 | 1/2006 | Eisl et al. | |
| 2006/0258371 A1 | 11/2006 | Krishnamurthi et al. | |
| 2011/0153805 A1 | 6/2011 | Beninghaus et al. | |
| 2011/0206012 A1 | 8/2011 | Youn et al. | |
| 2011/0237257 A1 | 9/2011 | Soliman et al. | |
| 2011/0264795 A1 | 10/2011 | Koide et al. | |
| 2011/0271007 A1 | 11/2011 | Wang et al. | |
| 2012/0166618 A1 | 6/2012 | Dahod et al. | |
| 2014/0003232 A1 | 1/2014 | Guichard et al. | |
| 2014/0171106 A1 | 6/2014 | Cheng et al. | |
| 2014/0179335 A1 | 6/2014 | Pikhletsky et al. | |
| 2014/0185581 A1 | 7/2014 | Senarath et al. | |
| 2014/0254373 A1 | 9/2014 | Varma | |
| 2014/0310388 A1 | 10/2014 | Djukic et al. | |
| 2014/0376406 A1 | 12/2014 | Kim et al. | |
| 2015/0063144 A1 | 3/2015 | Kozat | |
| 2015/0072705 A1 | 3/2015 | Zhang | |
| 2015/0092551 A1* | 4/2015 | Moisand | H04L 12/4633 370/235 |
| 2015/0141009 A1 | 5/2015 | Tamura et al. | |
| 2015/0163147 A1 | 6/2015 | Li et al. | |
| 2015/0195745 A1 | 7/2015 | Farmanbar et al. | |

FOREIGN PATENT DOCUMENTS

| | | |
|---|---|---|
| WO | 2007136567 A2 | 11/2007 |
| WO | 2011014558 A2 | 2/2011 |
| WO | 2013097900 A1 | 7/2013 |
| WO | 2013139298 A1 | 9/2013 |
| WO | 2013161178 A1 | 10/2013 |

OTHER PUBLICATIONS

Emilie, D et al., "A Practical Algorithm for Balancing the Max-Min Fairness and Throughput Objectives in Traffic Engineering," 2012 IEEE INFOCOM Proceedings, Mar. 25-30, 2012, 9 pages.

Han, T., et al. "Opportunistic Content Pushing via WiFi Hotspots," 3rd IEEE International Conference on Network Infrastructure and Digital Content (IC-NIDC), Sep. 21-23, 2012, 5 pages.

International Search Report and Written Opinion of the International Searching Authority received in Patent Cooperation Treaty Application No. PCT/CN2014/092607 dated Mar. 4, 2015, 12 pages.

International Search Report received in Application No. PCT/CN2015/085338, dated Nov. 3, 2015, 11 pages.

* cited by examiner

FRAMEWORK FOR TRAFFIC ENGINEERING IN SOFTWARE DEFINED NETWORKING

This application is a continuation-in-part of U.S. patent application Ser. No. 14/097,930, filed Dec. 5, 2013 and entitled "Framework for Traffic Engineering in Software Defined Networking," whose application is hereby incorporated by reference.

TECHNICAL FIELD

The present invention relates to a system and method for software defined networking, and, in particular embodiments, to a system and method for traffic engineering in software defined networking.

BACKGROUND

Software defined networking (SDN) decouples traffic management (i.e., the control plane) from traffic forwarding (i.e., the data plane). In the control plane, SDN manages the network resources (e.g., how to use them) and the control network traffic flows (e.g., where to send them) jointly by a central SDN controller. Traffic flows have diversified Quality of Experience (QoE) and Quality of Service (QoS) requirements (e.g., rate, delay, delay jitter, outage, buffering time, etc.), depending on their nature (e.g., video) and/or application (e.g., video conferencing or downloading, etc.). The SDN controller has the responsibility to engineer traffic, that is, to plan routes for traffic flows and allocate resources (e.g., capacity, spectrum, power, etc.) along the routes, jointly so that their Quality of Experience/Service (QoE/S) requirements are met efficiently and effectively. This is normally an optimization problem.

SUMMARY

In accordance with an embodiment, a method in a network component for traffic engineering (TE) in a software defined network (SDN) includes receiving TE information from a first core network component in a core network, a radio access network (RAN) component, wherein the RAN is communicatively coupled to the core network, and wherein the TE information includes a TE objective; and determining a TE decision between at least one UE and a second core network component in the core network according to the TE information and the TE objective, wherein the TE decision comprises information for at least one end-to-end path solution between the at least one UE and the second core network wherein the path traverses the core network and the RAN.

In accordance with an embodiment, a network component configured for traffic engineering (TE) in a software defined network (SDN) includes a processor and a computer readable storage medium storing programming for execution by the processor, the programming including instructions to: receive TE information from a first core network component in a core network, a radio access network (RAN) component, wherein the RAN is communicably coupled to the core network, and wherein the TE information includes a TE objective; and determine a TE decision between at least one UE and a second core network component in the core network according to the TE information and the TE objective, wherein the TE decision comprises information for at least one end-to-end path solution between the at least one UE and the second core network wherein the path traverses the core network and the RAN.

In accordance with an embodiment, a traffic engineering (TE) component in a software defined network (SDN) includes a first interface connected to at least one control/management component to receive TE information about a wireline network and a radio access network (RAN) and to receive TE configuration information; a second interface configured to receive a triggering event from one of the wireline network and the RAN; and a TE decision component connected to the first and second interfaces configured to determine a unified TE determination in response to the triggering event according to the TE information and TE configuration information, wherein the unified TE determination comprises a path selection between a source and destination for a plurality of source-destination pairs in the RAN and the core network and a rate allocation over selected paths for the plurality of source-destination pairs in the RAN and core network.

In accordance with an embodiment, a method for traffic engineering (TE) in a software defined network (SDN) includes receiving, by a TE component, a first TE information from a core network component in a core network; receiving, by the TE component, a second TE information from a radio access network (RAN) component in a RAN; and transmitting, by the TE component, a TE decision to at least one node in the SDN, wherein the TE decision is determined according to the first TE information and the second TE information, and the TE decision comprises at least one end-to-end path solutions based on a flow-path format or flow-link format.

In accordance with an embodiment, traffic engineering (TE) component in a software defined network (SDN) includes a first interface configured to receive a first TE information from a core network component in a core network and a second TE information from a radio access network (RAN) component in a RAN; and a second interface configured to transmit a TE decision to at least one node in the SDN, wherein the TE decision determined according to the first TE information and the second TE information, and the TE decision comprising at least one end-to-end path solutions according to a flow-path format or a flow-link format.

In accordance with an embodiment, a method for traffic engineering (TE) in a software defined network (SDN) includes transmitting, by a radio access network (RAN) component in a RAN, a second TE information to a TE component; and receiving, by the RAN component, a data packet from a source node; wherein the data packet carrying a data header generated based on a TE decision, wherein the TE decision determined according to a first TE information generating from a core network component in a core network and the second TE information, and the TE decision comprising at least one end-to-end path solutions based on a flow-path format or flow-link format.

In accordance with an embodiment, a radio access network (RAN) component in a RAN includes a transmitter configured to transmit a second TE information to a traffic engineering (TE) TE component in a software defined network (SDN); and a receiver configured to receive a data packet from a source node; wherein the data packet carrying a data header generated based on a TE decision, wherein the TE decision determined according to a first TE information generating from a core network component in a core network and the second TE information, and the TE decision comprising at least one end-to-end path solutions based on a flow-path format or a flow-link format.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1A:
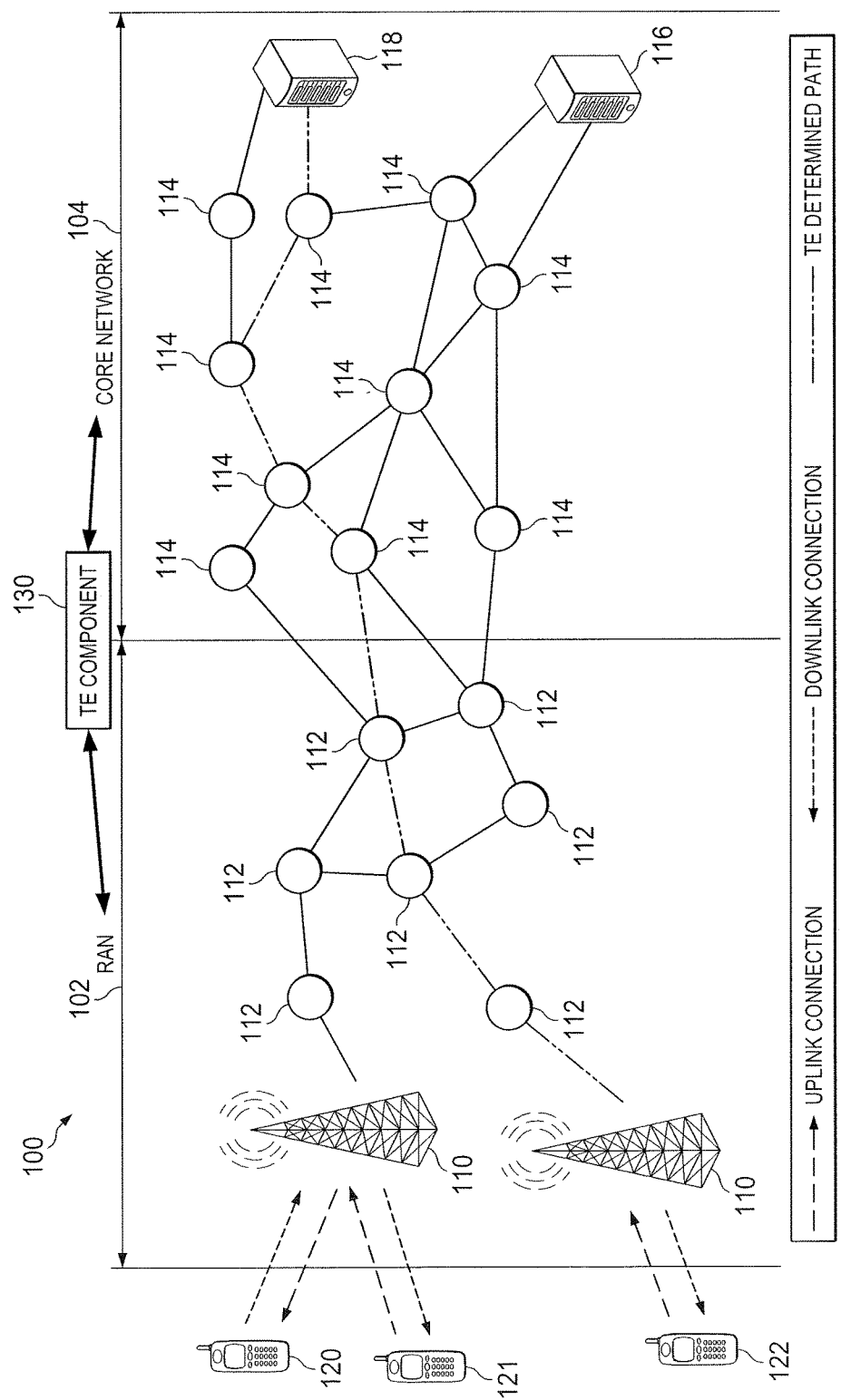
FIG. 1A illustrates a network for communicating data.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Existing traffic engineering (TE) solutions consider aggregate traffic in the core network and do not consider radio access networks (RAN). For example, RANs provide spectral efficiencies (SEs) that are not considered by existing TE solutions. Furthermore, existing TE solutions are not designed for cellular networks. However, handling core networks and RAN jointly will clearly improve system performance.

Disclosed herein are systems and methods for per service traffic management that consider wireless access networks and UEs in addition to the core wired network components in making a TE decision. Since different services have different requirements, per service traffic management provides that each service is treated according to its defined requirements. A service is defined by the logical data plane topology (obtained from other components). In an embodiment, the logical data plane topology includes source info (multiple sources are possible), destination info (multiple sinks are possible), and link QoE/S (e.g. throughput, etc.) requirements from sources to destinations.

Also disclosed herein is a traffic engineering (TE) framework that defines TE interface (input and output), defines a service requirement processing component, and adjusts service requirements according to service QoE/S feedback before inputting them into TE. For example, to reduce the rate requirement of a logical link with very high QoE performance in the past so that network resources can be used to satisfy logical links experiencing low QoE. Embodiments of the TE framework provide a unified TE decision, include user equipment (UEs) as part of network topology, and handle all network entities (whether wire-line or wireless) together. Embodiments of the TE framework include the mechanisms for per service management, TE interface, service requirement processing component, TE procedure, and a unified TE decision.

In an embodiment, a TE component collects TE information from a variety of network components in both the core network (i.e., wired network) and a radio access network (i.e., the wireless network) and provides a TE decision that encompasses an end-to-end solution from, for example, wireless user equipment to a network server in the core network. In an embodiment, the TE component is an SDN controller. However, the TE component may be implemented in other network components in other embodiments. The TE information may include network topology, including routers and user equipment (UEs), TE configuration (e.g., TE objective, multi-path vs. single path, etc.), link capacity and buffer size of wire-line part, radio resources at nodes and spectral efficiency (SE) values over radio links for the wireless part, per node operating cost, per link operating cost, source and destination information, QoE/S requirements between sources and destinations (e.g., rate, delay, etc.), and QoE/S feedback. SE is measured in bits/second/HZ. The SE value of a wireless access link indicates link quality and depends on radio transmission configuration at all access nodes. In an embodiment, the TE component computes a feasibility result and a TE decision based on the TE information received as inputs in response to receiving a triggering event. Examples of a triggering event include a one-time time out event, a periodic time out event, and input change event, and a service QoE/S performance degradation event. Examples of an input change event include a network topology change (e.g., node (router or UE) addition/removal), a network parameter change (e.g., a link SE change, a radio resource availability change, a link capacity change, a buffer size change, an operating cost change, etc.), and a service requirement (logical data plane topology) change (e.g., source/destination addition/removal, logical link (source to destination) QoE/S requirement change, etc.). The feasibility result is an indication of whether the current TE problem (defined by all the inputs) is feasible. The TE decision provides, for example, end-to-end paths (routes), per route resource/rate allocation, etc. or links used for end-to-end routing, per link resource/rate allocation, etc.

In an embodiment, a method in a network component for traffic engineering (TE) in a software defined network (SDN), includes identifying a TE objective, receiving TE information from a first core network component in a core network, a radio access network (RAN) component connected to the core network, wherein the RAN is communicably coupled to the core network, and wherein the TE information includes a TE objective, and determining a TE decision between the UE and a second core network component in the core network according to the TE information and the TE objective, wherein the TE decision includes information for at least one end-to-end path solution between the UE and the second core network wherein the path traverses the core network and the RAN. In an embodiment, the TE decision includes path selection between a source and destination for a plurality of source-destination pairs in the network as well as rate allocation over selected paths for all source-destination pairs in the network, where the network includes both the RAN and a core network. In an embodiment, determining a TE decision between the UE and a second core network component is performed in response to a triggering event. The triggering event may include a network topology change, a network parameter change, a service requirement change, and a service quality of experience or quality of service performance degradation event. The network topology change may include a node addition or removal. The network parameter change includes at least one of a radio resource availability change, a link capacity change, a buffer size change, an operating cost change, and a link SE change. The service requirement change includes at least one of a source addition, destination addition, a source removal, a destination removal, a logical link quality of experience requirement change, and a logical link quality of service requirement change. The TE decision may include an end-to-end path, a per route resource allocation, a per route rate allocation, links used for end-to-end routing, per link resource allocation, and per link rate allocation. In an embodiment, the TE method includes adjusting a path computation algorithm or process according to a change in traffic engineering configuration parameters. For example, if the TE configuration explicitly specifies what path computation algorithm is to be used, then when the configuration changes or the specified algorithm changes, the adjustment to the path computation algorithm used by the TE is made. The traffic engineering information may include quality of experience requirements between sources and destinations and quality of service requirements between sources and destinations, a rate requirement, a delay requirement, a quality of experience feedback, quality of service feedback, and network parameters. The network parameters may include link capacity, buffer size, radio resources at RAN nodes, per node operating cost, and per link operating cost.

FIG. 1A illustrates a network 100 for communicating network. The network 100 includes a RAN 102, a core network 104, and a TE component 130 in communication with one or more components in each of the RAN 102 and the core network 104. The core network 104 and the RAN 102 may comprise a software defined network (SDN). In an embodiment, the TE component 130 may be implemented within one of the core nodes 114 in the core network 104 or one of the RAN nodes 112 in the RAN 102. In an embodiment, the TE component is a logical component and can be implemented on one physical node or in a distributed manner on multiple physical nodes. The RAN 102 includes a plurality of RAN nodes 112 and wireless access points (APs) 110. A plurality of user equipment (UEs) 120, 121, 122 are wirelessly connected to the APs 110. As used herein, the term AP may also be referred to as a transmission point (TP), a base station (BS), or a base transceiver station (BTS) and the four terms may be used interchangeably throughout this disclosure. The APs 110 each may comprise any component capable of providing wireless access by, inter alia, establishing uplink (UL) (dashed line) and/or downlink (DL) (dotted line) connections with the UEs 120, 121, 122, such as a BTS, an enhanced base station (eNB), a femtocell, and other wirelessly enabled devices. The UEs 120, 121, 122 may comprise any component capable of establishing a wireless connection with the APs 110. Examples of UEs include smart phones, tablet computers, and laptops. The RAN nodes 112 connect or otherwise communicably couple the APs 110 to the core network 104. The connections between the RAN nodes 112 may include wired and wireless connections. The RAN nodes 112 may include routers, switches, and gateways.

The core network 104 includes a plurality of core nodes 114 and end point servers 116, 118. In an embodiment, the core network 104 may be the Internet, a local area network (LAN), or a wide area network (WAN). Connections between the core nodes 114 are wired or physical connections, such as fiber optic cables. Examples of core nodes 114 include routers, switches, and servers. Each core node 114 is capable of receiving data from other nodes and transmitting or forwarding data to other nodes.

The TE component 130 includes an interface to other control/management components within the core network 104 and/or the RAN 102. TE component 130 receives TE information from various nodes 112, 114 in the RAN 102 and the core network 104 and provides TE determinations to the nodes 112, 114. In an embodiment, the TE information includes information about both the RAN 102, the core network 104, and the UEs 120, 121, 122. The TE information may include network topology information, which includes routers and UEs in the topology. The TE information may also include TE configuration information, such as, for example, a TE objective, multipath vs. single path information, etc. TE information includes network parameters concerning the core network 104 (i.e., wire-line part), the RAN 102 (i.e., wireless part), as well as other network parameters. The core network 104 (i.e., wire-line) part of the network parameters include information, such as, for example, link capacity and buffer size. The RAN 102 (i.e., wireless) part of the network parameters includes information, such as radio resources at nodes 112, SE over radio links, etc. Other network parameters include per node operating cost, per link operating cost, etc. Other information collected by the TE component 130 include information regarding sources and destinations of data, quality of experience and quality of service (QoE/S) requirement between sources and destinations (e.g., rate, delay, etc.), and service QoE/S feedback.

The TE component 130 computes a feasibility result and a TE decision from the inputs in response to a triggering event. In an embodiment, the TE decision includes end-to-end paths (routes), per route resource and rate allocation. In a second embodiment, the TE decision includes links used for end-to-end routing, and/or per link resource/rate allocation. In a third embodiment, the TE decision includes a mixture of the information included in the first and second embodiments discussed above. The TE component 103 may compute multiple paths or a single path. TE determined path (represented by the dashed-dotted line in FIG. 1) is an example of one path from/to UE 122 to/from a server 118 across both the RAN 102 and the core network 104 determined by the TE component 130. In an embodiment, the TE component 130 also computes a feasibility result indicating whether a current TE problem as defined by all of the inputs is feasible or not. In an embodiment, TE functionality does not change as a result of infeasibility. Rather, the TE decision still finds paths for all source-destination pairs and finds allocation for all paths. Infeasibility is just an indication that the rate allocation resulting from the TE determination cannot fully satisfy all user QoE requirements. In an embodiment, the TE decision in a flow-path format includes end-to-end paths and the corresponding rate allocations for each flow on each path ($p_j^k$, $x_j^k$, for all flow k and path j of flow k, where $p_j^k$ is an end-to-end path for flow k and $x_j^k$ is the rate allocation for flow k on path j). In an embodiment, the TE decision in a flow-link format includes rate allocations for each flow on each link ($y_e^k$ for all link e and flow k, where $y_e^k$ is the rate allocation for flow k on link e). In an embodiment, the data packet includes a data header and the data header includes the path ID and/or the link ID. In an embodiment, the source node adds the data header into the data packets based on the TE decision.

Figure 1B:
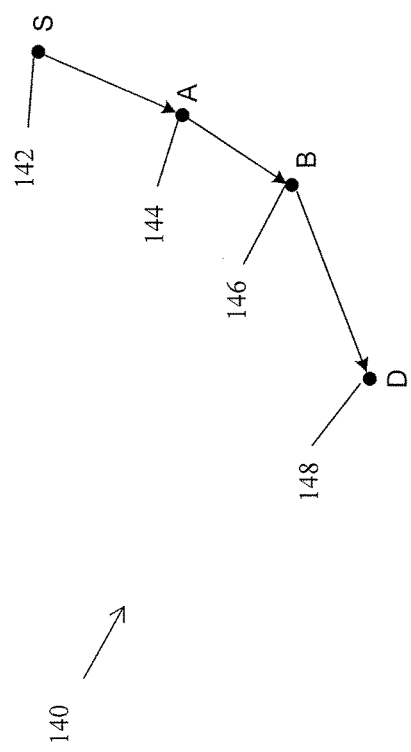
FIG. 1B is a diagram illustrating an embodiment path flow for nodes configured according to a flow-path format.

FIG. 1B is a diagram illustrating an embodiment path flow 140 for nodes configured according to a flow-path format. Regarding node configuration for the flow-path format, in an embodiment, packets shall carry a path ID indicating the end-to-end path and the flow (logical link) that the path ID belongs to. Assignment of path IDs to packets is done at the source nodes according to path rate allocation from the TE decision, $x_j^k$. At any network node (e.g., core node, RAN node, etc.), packets are forwarded to the next node according to the path. If the node is a destination node, no forwarding is performed.

As an example, consider a path from source node S 142 to intermediate node A 144 to intermediate node B 146 to destination node D 148 with packet ID x. The path direction is indicated by the arrows in FIG. 1B. At node S 142, packets with ID x are forwarded to node A 144. At node A 144, packets with ID x are forwarded to node B 146. At node B 146, packets with ID x are forwarded to node D 148.

Figure 1C:
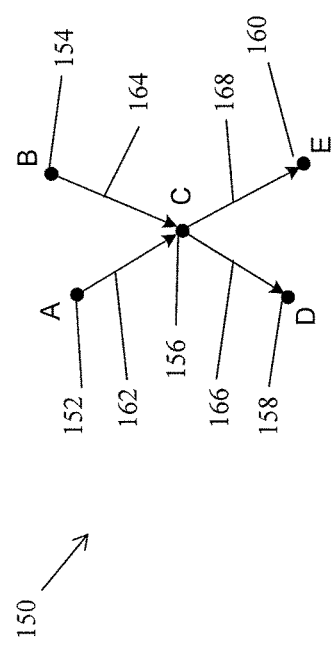
FIG. 1C is a diagram illustrating an embodiment path flow for nodes configured with flow-link format.

FIG. 1C is a diagram illustrating an embodiment path flow 150 for nodes configured with flow-link format. The nodes for path flow 150 include node A 152, node B 154, node C 156, node D 158, and node E 160. The links between the nodes 152, 154, 156, 158, 160 are link AC 162, link BC 164, link CD 166, and link CE 168. Traffic flows as indicated by the arrows. In an embodiment for nodes configured with the flow-link format, packets shall carry flow (logical link) IDs. The flow IDs are given to packets at source nodes. At any given network node (e.g., core node, RAN node, etc.), packets are forwarded to a next node according to flow ID and link rate allocations for the flow from the TE decision, $y_e^k$. For example, suppose link allocation for flow fat links AC, BC, CD, and CE is given by $y_{AC}^k$, $y_{BC}^k$, $y_{CD}^k$ and $y_{CE}^k$. Packets received at node C 156 with flow ID f are forwarded to nodes D 158 and E 160 according to the ratios $$\frac{y_{CD}^f}{y_{AC}^f + y_{BC}^f} \text{ and } \frac{y_{CE}^f}{y_{AC}^f + y_{BC}^f},$$

respectively.

Figure 2:
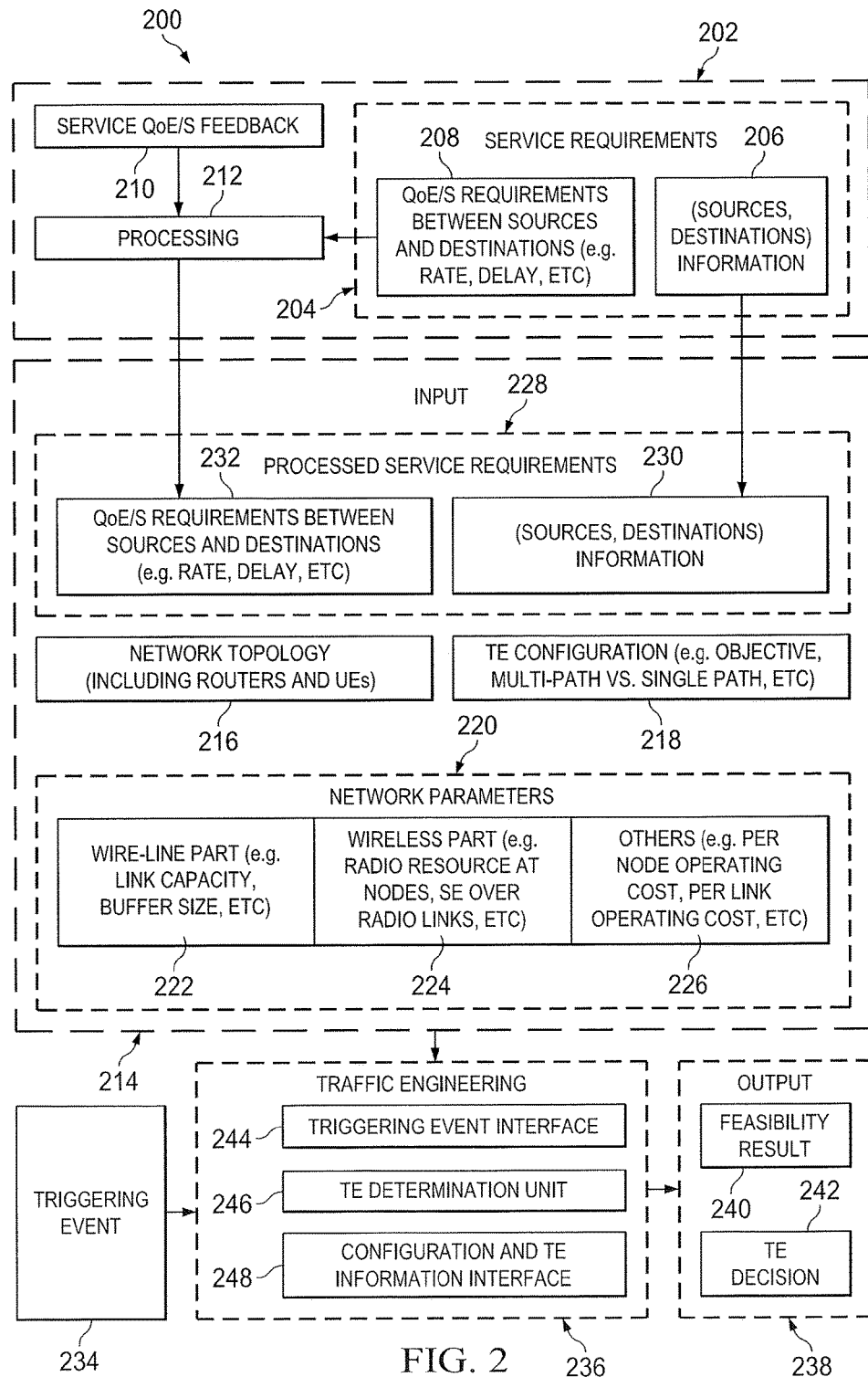
FIG. 2 illustrates an embodiment of a TE framework.

FIG. 2 illustrates an embodiment of a TE framework 200. TE framework includes a TE component 236 that receives input 214 and computes an output 238 in response to a triggering event. In an embodiment, some triggering events are internal. For example, the TE component 236 can compute the output at every 10 seconds without any external trigger. As used herein, such internal events are referred to as triggers even though they are not external to the TE component 236. TE component 236 may be implemented as TE component 130 in FIG. 1. The input includes network topology inputs 216, TE configuration inputs 218, network parameters 220, and processed service requirements 228. The topology includes both core and RAN topologies. In an embodiment, the TE configuration inputs 218 are implementation parameters that are selected by the network operator. The network parameters 220 may be provided by the core network and/or the RAN. For example, wired link capacities are provided by the core network and wireless link SEs are provided by the RAN. Examples of network topology inputs 216 include location, identity, and performance capabilities of routers, switches, UEs, and other similar components. Examples of TE configuration inputs 218 include a TE objective, an indication of whether a multi-path or a single path should be computed, etc. The TE objective is the objective function used for TE optimization problem. Examples of a TE objective include weighted maximum minimum and maximum sum rate. The network parameters 220 include wire-line part parameters 222, wireless part parameters 224, and other network parameters 226. Wire-line part parameters 222 include, for example, link capacity, buffer size, etc. Wireless part parameters 224 include, for example, radio resources at nodes, SE over radio links, etc. Other network parameters 226 include per node operating cost, per link operating cost, etc.

Processed service requirements 228 receives source and destination information 230 from a source and destination information element 206 in service processing unit 202. Processed service requirements 228 also receives QoE/S requirements between sources and destinations 232 from a processing unit 212 in the service processing unit 202. The service processing unit 202 includes a service requirements component 204 that collects and/or stores service requirements. The service requirements include source and destination information 206 and QoE/S requirements between sources and destinations 208. Examples of QoE/S requirements include rate, delay, etc. The service processing unit 202 also receives service QoE/S feedback 210 and processes the feedback 210 along with the QoE/S requirements 208 in a processing unit 212. The service processing unit 202 determines the QoE/S input to the TE component 236 based on the raw QoE/S requirements and the QoE/S feedback. For example, it may reduce the rate requirement (as QoE/S requirement) of a logical link with very high QoE/S performance in the past so that the network resources can be used to satisfy logical links experiencing low QoE/S. The results of the processing are provided as part of the processed service requirements 228 used as input to the TE component 236.

In response to a triggering even 234, the TE component 236 uses the input 214 to determine an output 238. The output 238 includes a feasibility result 240 and a TE decision. Examples of a triggering event 234 include a time out event (one time or periodic time out event), an input change event, a service QoE/S performance degradation event. Examples of an input change event include a network topology change (e.g., node (router or UE) addition/removal), network parameter change (e.g., link SE change, radio resource availability change, link capacity change, buffer size change, operating cost change, etc.), and service requirement (logical data plane topology) change (e.g., source/destination addition/removal, logical link (source to destination) QoE/S requirement change).

The TE component 236 includes a configuration and TE information interface to receive configuration and TE input from various components (e.g., controllers, management components, nodes, etc.), a triggering event interface 244 to receive triggering event information from various components in a wireless (e.g., RAN) or wired network, and a TE determination unit 246 that determines a feasibility result 240 and a TE decision 242.

To determine a feasibility result and/or a TE decision, the TE component 236 performs a TE procedure. In an embodiment, the TE component 236 determines routing path candidates. To determine routing path candidates, the TE component 236 finds a maximum number of candidate routing paths for each logical link (source-destination). The maximum number of candidate routing paths may be pre-computed or computed in real time by the TE component 236.

In an embodiment, the TE component 236 solves an optimization problem in order to produce a TE decision 242. The optimization problem includes an optimization objective (i.e., the TE objective) that is obtained from the TE configuration 218, network parameter based constraints, service requirement constraints, and other constraints. Network parameter based constraints include wire-line link capacity constraints, wireless access node resource constraints, per node/link operating cost constraints, etc. The cost constraints may be, for example, power consumption. The service requirements constraints include logical link rate (throughput) constraints, logical link delay constraints, etc. Other constraints include, for example, the number of routing paths per logical link, etc. The feasibility result 240 produced by the TE component 236 provides an indication of whether the current TE problem as defined by all the inputs is feasible. In an embodiment, the TE feasibility result 240 is a byproduct of solving the TE problem. Regardless of whether the TE problem is feasible, the TE component 240 determines a TE decision 242. However, if the TE problem is infeasible, the TE decision 242 may not satisfy all of the flow requirements (e.g., user QoE requirements, QoS requirements, etc.) for all flows. When full satisfaction is impossible, TE can partially satisfy flows. The TE decision 242 may include one or more end-to-end paths (routes), per route resource/rate allocation, etc. In an embodiment, the TE decision 242 may include links used for end-to-end routing, per link resource/rate allocation, etc. The TE decision 242 output is provided to routers and access nodes in the RAN and core network such that traffic is forwarded at each node according to the TE decision 242. In an embodiment, the TE component 246 may also provide the TE feasibility result to a controller so that the controller may take appropriate control actions.

In an example TE procedure performed by the TE component 236, the input to the TE component 236 includes TE configuration information, including a weighted maximum minimum objective, max $\lambda$, and the maximum number of paths per logical link, m. The input also includes service requirement of the logical links (source-destination) and per logical link rate/throughput demand, $d_k$, where $d_k$ is the rate/throughput demand for link k. Additionally, the input includes wire-line link capacities, $c_e$, where $c_e$ is the capacity for wired link e, wireless access node resources, $r_n$, where $r_n$ is the wireless access node resource for node n, and wireless link SE, $s_{path}^n$, where $s_{path}^n$ is the wireless link SE for the wireless access link of n on path. The output is a feasibility result $\lambda$, where the TE problem is feasible if $\lambda \geq 1$ and infeasible otherwise. The output also includes a TE decision that provides routing paths for every logical link k and a rate allocation, $x_j^k$, on the j-th routing path of logical link k. The TE procedure includes determining routing path candidates by running m shortest path routing algorithm for each logical link. Every logical link, k, than has $l_k \leq m$ number of candidate paths, $p_j^k$, j=1, 2, . . . , $l_k$. The TE component 236 then soles the following optimization problem (weighted Max Min fairness):

The objective function → $\max \lambda$

Service requirement constraints → $\sum_{j=1}^{l_k} x_j^k \geq \lambda d_k$, $\forall$ logical link $k$ only rate/throughput is considered for simplicity of presentation.

Wire-line link capacity constraints → $\sum_{path\ p_j^k\ passing\ link\ e} x_j^k \leq c_e$, $\forall$ wired link $e$ Wireless access node resources constraints → $\sum_{path\ p_j^k\ using\ n} \frac{x_j^k}{s_{p_j^k}^n} \leq r_n$, $\forall$ wireless access node $n$ Candidate paths (determined previously) → $p_j^k, j = 1, 2, \ldots, l_k,$ $\forall$ logical link $k$.

Another embodiment is provided here in which determination of candidate paths for flows is not required. Denote the source and destination node corresponding to flow k by S(k) and D(k), respectively. Let $A_{in}(n)$ and $A_{out}(n)$ be the set of arcs going into and out of node n, respectively. We denote the allocation of flow k on link a by $y_a^k$. We denote the SE of wireless link a by $s_a$. The TE component 236 solves the following optimization problem with weighted max min objective The objective function $\quad \max \lambda$ Flow conservation constraints $$\sum_{a \in A_{in}(n)} y_a^k - \sum_{a \in A_{out}(n)} y_a^k = \begin{cases} 0 & \forall n \neq S(k), n \neq D(k) \\ -\lambda d_k & n = S(k) \\ \lambda d_k & n = D(k) \end{cases} \forall \text{ logical link } k$$

Backhaul link constraints $\quad \sum_k y_a^k \leq c_a,$ $\forall$ wired link $a$.

The wireless access node constraints $\quad \sum_k \sum_{a \in A_{out}(n)} \frac{y_a^k}{s_a} \leq r_n,$ $\forall$ wireless access node $n$.

Figure 3:
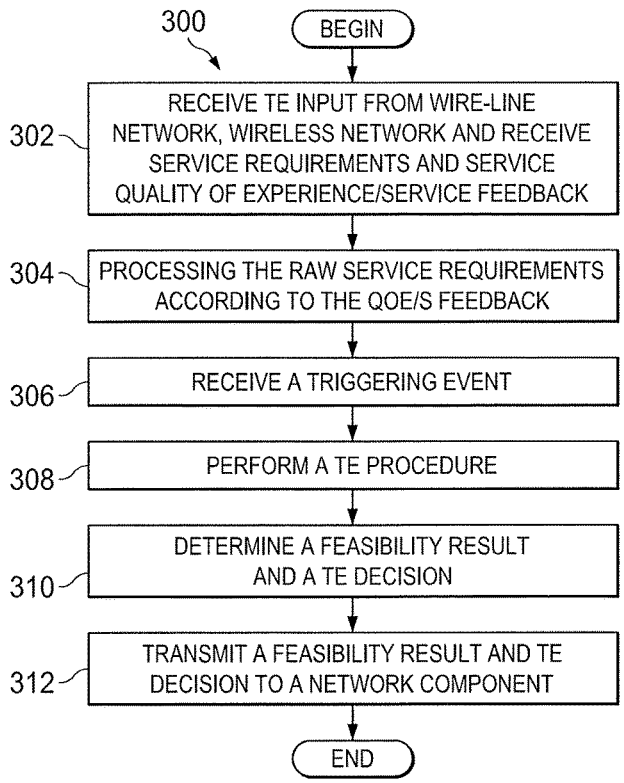
FIG. 3 illustrates an embodiment method for a TE feasibility and decision determination.

FIG. 3 illustrates an embodiment method 300 for a TE feasibility and decision determination. The method 300 begins at block 302 where the TE component receives TE input from a wire-line network, a wireless network, and receives service requirements and service QoE/S feedback. At block 304, the raw service requirements are processed according to the QoE/S feedback. At block 306, the TE component receives a triggering event causing the TE component to implement a TE procedure at block 308. In an embodiment, the TE procedure solves an optimization problem based on the input. At block 310, the TE component determines a feasibility result and a TE decision from the TE procedure. At block 312, the feasibility result and/or TE decision is transmitted to a network component, after which, the method 300 ends.

Figure 4:
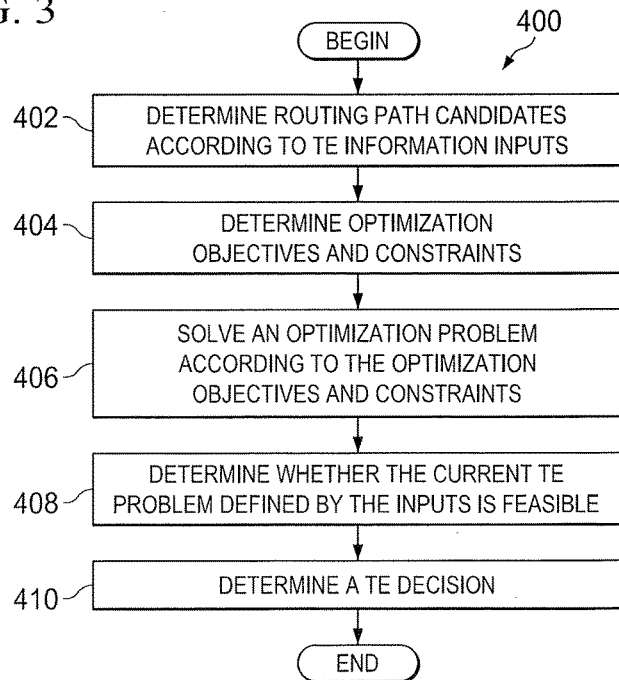
FIG. 4 illustrates an embodiment TE procedure.

FIG. 4 illustrates an embodiment TE procedure 400. TE procedure 400 is an example of TE procedure 308 in FIG. 3. TE procedure 400 begins at block 402 where the TE component determines routing path candidates according to TE information inputs. At block 404, the TE component determines optimization objective(s) and constraint(s). At block 406, the TE component solves an optimization problem according to the optimization objective(s) and constraint(s). At block 408, the TE component determines whether the current TE problem defined by the inputs is feasible and at block 410, the TE component determines a TE decision, after which the TE procedure 400 ends.

Figure 5:
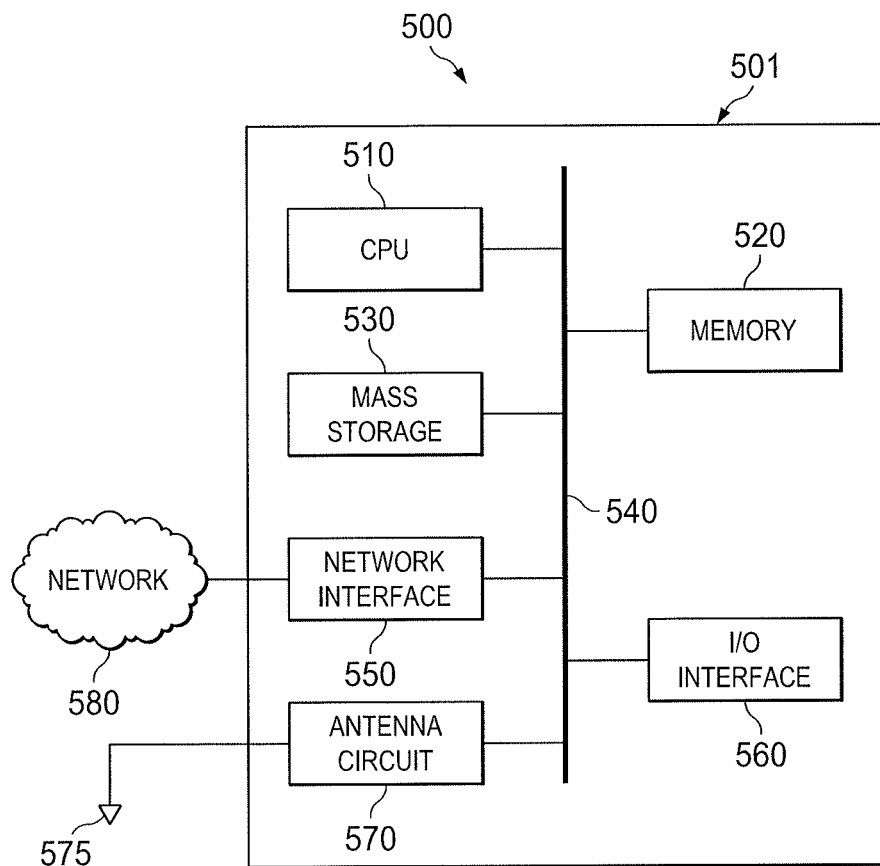
FIG. 5 illustrates a computing platform that may be used for implementing, for example, the devices and methods described herein, in accordance with an embodiment.

FIG. 5 is a block diagram of a processing system 500 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 500 may comprise a processing unit 501 equipped with one or more input/output devices, such as a speaker, microphone, mouse, touchscreen, keypad, keyboard, printer, display, and the like. The processing unit 501 may include a central processing unit (CPU) 510, memory 520, a mass storage device 530, a network interface 550, an I/O interface 560, and an antenna circuit 570 connected to a bus 540. The processing unit 501 also includes an antenna element 575 connected to the antenna circuit.

The bus 540 may be one or more of any type of several bus architectures including a memory bus or memory controller, a peripheral bus, video bus, or the like. The CPU 510 may comprise any type of electronic data processor. The memory 520 may comprise any type of system memory such as static random access memory (SRAM), dynamic random access memory (DRAM), synchronous DRAM (SDRAM), read-only memory (ROM), a combination thereof, or the like. In an embodiment, the memory 520 may include ROM for use at boot-up, and DRAM for program and data storage for use while executing programs.

The mass storage device 530 may comprise any type of storage device configured to store data, programs, and other information and to make the data, programs, and other information accessible via the bus 540. The mass storage device 530 may comprise, for example, one or more of a solid state drive, hard disk drive, a magnetic disk drive, an optical disk drive, or the like.

The I/O interface 560 may provide interfaces to couple external input and output devices to the processing unit 501. The I/O interface 560 may include a video adapter. Examples of input and output devices may include a display coupled to the video adapter and a mouse/keyboard/printer coupled to the I/O interface. Other devices may be coupled to the processing unit 501 and additional or fewer interface cards may be utilized. For example, a serial interface such as Universal Serial Bus (USB) (not shown) may be used to provide an interface for a printer.

The antenna circuit 570 and antenna element 575 may allow the processing unit 501 to communicate with remote units via a network. In an embodiment, the antenna circuit 570 and antenna element 575 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 570 and antenna element 575 may also provide Bluetooth and/or WiFi connection to other devices.

The processing unit 501 may also include one or more network interfaces 550, which may comprise wired links, such as an Ethernet cable or the like, and/or wireless links to access nodes or different networks. The network interface 501 allows the processing unit 501 to communicate with remote units via the networks 580. For example, the network interface 550 may provide wireless communication via one or more transmitters/transmit antennas and one or more receivers/receive antennas. In an embodiment, the processing unit 501 is coupled to a local-area network or a wide-area network for data processing and communications with remote devices, such as other processing units, the Internet, remote storage facilities, or the like.

An embodiment method for traffic engineering (TE) in a software defined network (SDN) includes receiving, by a TE component, a first TE information from a core network component in a core network; receiving, by the TE component, a second TE information from a radio access network (RAN) component in a RAN; and transmitting, by the TE component, a TE decision to at least one node in the SDN, wherein the TE decision is determined according to the first TE information and the second TE information, and the TE decision comprises at least one end-to-end path solutions based on a flow-path format or flow-link format. In an embodiment, the flow-path format comprises at least one path between a source and destination for a plurality of source destination pairs in the SDN and a rate allocation over the at least one path for the plurality of source destination pairs; the flow-link format comprises per link resource allocation for a plurality of source destination pairs in the SDN. In an embodiment, the method further includes receiving, by the TE component, a TE configuration selected by an network operator; and determining, by the TE component, the TE decision based on the first TE information and the second TE information and the TE configuration. In an embodiment, the TE configuration includes a TE objective for controlling network resources assigned to different services. In an embodiment, the method further includes receiving, by the TE component, a service requirement; and determining, by the TE component, the TE decision based on the first TE information and the second TE information, the TE configuration and the service requirement. In an embodiment, the service requirement includes at least one of quality of experience requirements between sources and destinations and quality of service requirements between sources and destinations; or at least one of quality of experience feedback and quality of service feedback. In an embodiment, the method further includes receiving, by the TE component, a TE triggering event comprising at least one of a one-time time out event, a periodic time out event, an input change event, and a service quality of experience (QoE) and quality of service (QoS) performance degradation event; and determining, by the TE component, the TE decision in response to receiving the TE triggering event. In an embodiment, the input change event includes one of a network topology change, a network parameter change, a service requirement change, and a service quality of experience or quality of service performance degradation event. In an embodiment, the first TE information and the second TE information comprise network topology information and network parameter. In an embodiment, the network parameter in the second TE information further comprises spectral efficiency (SE) values for radio links. In an embodiment, the method further includes determining, by the TE component, routing path candidate from a maximum number of candidate routing paths for each logical link. In an embodiment, the method further includes transmitting, by the TE component, a feasibility result indicating whether a current TE problem defined by the TE information is feasible. In an embodiment, the TE decision comprises at least one of an end-to-end path, a per route resource allocation, a per route rate allocation, links used for end-to-end routing, per link resource allocation, and per link rate allocation.

An embodiment traffic engineering (TE) component in a software defined network (SDN) includes a first interface configured to receive a first TE information from a core network component in a core network and a second TE information from a radio access network (RAN) component in a RAN; and a second interface configured to transmit a TE decision to at least one node in the SDN, wherein the TE decision determined according to the first TE information and the second TE information, and the TE decision comprising at least one end-to-end path solutions according to a flow-path format or a flow-link format. In an embodiment, the flow-path format includes at least one path between a source and destination for a plurality of source destination pairs in the SDN and a rate allocation over the at least one path for the plurality of source destination pairs; the flow-link format comprises per link resource allocation for a plurality of source destination pairs in the SDN. In an embodiment, the first interface is further configured to receive a TE configuration selected by a network operator, wherein the TE decision determined according to the first TE information and the second TE information and the TE configuration. In an embodiment, the first interface is further configured to receive a service requirement, wherein the TE decision determined according to the first TE information and the second TE information, the TE configuration and the service requirement. In an embodiment, the TE component further comprises a third interface, wherein the third interface configured to receive a TE triggering event, wherein TE triggering event includes at least one of a one-time time out event, a periodic time out event, an input change event, and a service quality of experience (QoE) and a quality of service (QoS) performance degradation event. In an embodiment, the second interface is further configured to transmit a feasibility result, wherein the feasibility result is used to indicate whether a current TE problem defined by the TE information is feasible.

An embodiment method for traffic engineering (TE) in a software defined network (SDN) includes transmitting, by a radio access network (RAN) component in a RAN, a second TE information to a TE component; and receiving, by the RAN component, a data packet from a source node; wherein the data packet carrying a data header generated based on a TE decision, wherein the TE decision determined according to a first TE information generating from a core network component in a core network and the second TE information, and the TE decision comprising at least one end-to-end path solutions based on a flow-path format or flow-link format. In an embodiment, the data header comprises a path ID indicating at least one path between a source and destination for a plurality of source destination pairs in the SDN and a rate allocation over the at least one path for the plurality of source destination pairs; or the data header comprises a flow ID indicating per link resource allocation for a plurality of source destination pairs in the SDN. In an embodiment, the TE decision is determined according to the first TE information, the second TE information and a TE configuration, wherein the TE configuration comprises a TE objective for controlling network resources assigned to different services. In an embodiment, the TE decision is determined according to the first TE information, the second TE information, the TE configuration and a service requirement, wherein the service requirement comprises at least one of quality of experience requirements between sources and destinations and quality of service requirements between sources and destinations; or at least one of quality of experience feedback and quality of service feedback.

An embodiment radio access network (RAN) component in a RAN includes a transmitter configured to transmit a second TE information to a traffic engineering (TE) TE component in a software defined network (SDN); and a receiver configured to receive a data packet from a source node; wherein the data packet carrying a data header generated based on a TE decision, wherein the TE decision determined according to a first TE information generating from a core network component in a core network and the second TE information, and the TE decision comprising at least one end-to-end path solutions based on a flow-path format or a flow-link format. In an embodiment, the data header includes a path ID indicating at least one path between a source and destination for a plurality of source destination pairs in the SDN and a rate allocation over the at least one path for the plurality of source destination pairs; or the data header comprises a flow ID indicating per link resource allocation for a plurality of source destination pairs in the SDN. In an embodiment, the TE decision is determined according to the first TE information, the second TE information, the TE configuration and a service requirement, wherein the service requirement comprises at least one of quality of experience requirements between sources and destinations and quality of service requirements between sources and destinations; or at least one of quality of experience feedback and quality of service feedback. In an embodiment, the TE decision is determined according to the first TE information, the second TE information and a TE configuration, wherein the TE configuration comprises a TE objective for controlling network resources assigned to different services.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for traffic engineering (TE) in a network, the method comprising:
receiving, by a TE component, a first TE information from a core network component in a core network;
receiving, by the TE component, a second TE information from a radio access network (RAN) component in a RAN; and
transmitting, by the TE component, a TE decision to at least one node in the network,
wherein the TE decision is determined according to the first TE information and the second TE information, and the TE decision comprises at least one end-to-end path solutions based on a flow-path format or flow-link format.

2. The method of claim 1, wherein the flow-path format comprises at least one path between a source and destination for a plurality of source destination pairs in the network and a rate allocation over the at least one path for the plurality of source destination pairs; and wherein the flow-link format comprises per link resource allocation for a plurality of source destination pairs in the network.

3. The method of claim 1, further comprising:
receiving, by the TE component, a TE configuration selected by an network operator; and
determining, by the TE component, the TE decision based on the first TE information and the second TE information and the TE configuration.

4. The method of claim 3, wherein the TE configuration comprises a TE objective for controlling network resources assigned to different services.

5. The method of claim 3, further comprising:
receiving, by the TE component, a service requirement; and
determining, by the TE component, the TE decision based on the first TE information and the second TE information, the TE configuration and the service requirement.

6. The method of claim 5, wherein the service requirement comprises at least one of quality of experience requirements between sources and destinations and quality of service requirements between sources and destinations; or at least one of quality of experience feedback and quality of service feedback.

7. The method of claim 1, further comprising:
receiving, by the TE component, a TE triggering event comprising at least one of a one-time time out event, a periodic time out event, an input change event, and a service quality of experience (QoE) and quality of service (QoS) performance degradation event; and
determining, by the TE component, the TE decision in response to receiving the TE triggering event.

8. The method of claim 7, wherein the input change event comprises one of a network topology change, a network parameter change, a service requirement change, and a service quality of experience or quality of service performance degradation event.

9. The method of claim 1, wherein the first TE information and the second TE information comprise network topology information and network parameter.

10. The method of claim 9, wherein the network parameter in the second TE information further comprises spectral efficiency (SE) values for radio links.

11. The method of claim 1, further comprises:
determining, by the TE component, routing path candidate from a maximum number of candidate routing paths for each logical link.

12. The method of claim 1, further comprising:
transmitting, by the TE component, a feasibility result indicating whether a current TE problem defined by the TE information is feasible.

13. The method of claim 1, wherein the TE decision comprises at least one of an end-to-end path, a per route resource allocation, a per route rate allocation, links used for end-to-end routing, per link resource allocation, and per link rate allocation.

14. A traffic engineering (TE) component in a network, comprising:
a first interface configured to receive a first TE information from a core network component in a core network and a second TE information from a radio access network (RAN) component in a RAN; and
a second interface configured to transmit a TE decision to at least one node in the network,
wherein the TE decision determined according to the first TE information and the second TE information, and the TE decision comprising at least one end-to-end path solutions according to a flow-path format or a flow-link format.

15. The TE component of claim 14, wherein the flow-path format comprises at least one path between a source and destination for a plurality of source destination pairs in the network and a rate allocation over the at least one path for the plurality of source destination pairs; the flow-link format comprises per link resource allocation for a plurality of source destination pairs in the network.

16. The TE component of claim 14, wherein the first interface is further configured to receive a TE configuration selected by a network operator, wherein the TE decision determined according to the first TE information and the second TE information and the TE configuration.

17. The TE component of claim 16, wherein the first interface is further configured to receive a service requirement, wherein the TE decision determined according to the first TE information and the second TE information, the TE configuration and the service requirement.

18. The TE component of claim 14, wherein the TE component further comprises a third interface, wherein the third interface configured to receive a TE triggering event, wherein TE triggering event comprises at least one of a one-time time out event, a periodic time out event, an input change event, and a service quality of experience (QoE) and a quality of service (QoS) performance degradation event.

19. The TE component of claim 14, wherein the second interface is further configured to transmit a feasibility result, wherein the feasibility result is used to indicate whether a current TE problem defined by the TE information is feasible.

20. A method for traffic engineering (TE) in a network, the method comprising:
transmitting, by a radio access network (RAN) component in a RAN, a second TE information to a TE component; and
receiving, by the RAN component, a data packet; wherein the data packet carries a data header generated based on a TE decision,
wherein the TE decision determined according to a first TE information generating from a core network component in a core network and the second TE information, and the TE decision comprising at least one end-to-end path solutions based on a flow-path format or flow-link format.

21. The method of claim 20, wherein the data header comprises a path ID indicating at least one path between a source and destination for a plurality of source destination pairs in the network and a rate allocation over the at least one path for the plurality of source destination pairs; or the data header comprises a flow ID indicating per link resource allocation for a plurality of source destination pairs in the network.

22. The method of claim 20, wherein the TE decision is determined according to the first TE information, the second TE information and a TE configuration, wherein the TE configuration comprises a TE objective for controlling network resources assigned to different services.

23. The method of claim 22, wherein the TE decision is determined according to the first TE information, the second TE information, the TE configuration and a service requirement, wherein the service requirement comprises at least one of quality of experience requirements between sources and destinations and quality of service requirements between sources and destinations; or at least one of quality of experience feedback and quality of service feedback.

24. A radio access network (RAN) component in a RAN, comprising:
a transmitter configured to transmit a second TE information to a traffic engineering (TE) TE component in a network; and
a receiver configured to receive a data packet; wherein the data packet carries a data header generated based on a TE decision,
wherein the TE decision determined according to a first TE information generating from a core network component in a core network and the second TE information, and the TE decision comprising at least one end-to-end path solutions based on a flow-path format or a flow-link format.

25. The RAN component of claim 24, wherein the data header comprises a path ID indicating at least one path between a source and destination for a plurality of source destination pairs in the network and a rate allocation over the at least one path for the plurality of source destination pairs; or the data header comprises a flow ID indicating per link resource allocation for a plurality of source destination pairs in the network.

26. The RAN component of claim 25, wherein the TE decision is determined according to the first TE information, the second TE information, the TE configuration and a service requirement, wherein the service requirement comprises at least one of quality of experience requirements between sources and destinations and quality of service requirements between sources and destinations; or at least one of quality of experience feedback and quality of service feedback.

27. The RAN component of claim 24, wherein the TE decision is determined according to the first TE information, the second TE information and a TE configuration, wherein the TE configuration comprises a TE objective for controlling network resources assigned to different services.

* * * * *